June 27, 1933.  W. C. HEDGCOCK  1,916,145
TRUCK
Filed Oct. 2, 1931  6 Sheets-Sheet 3
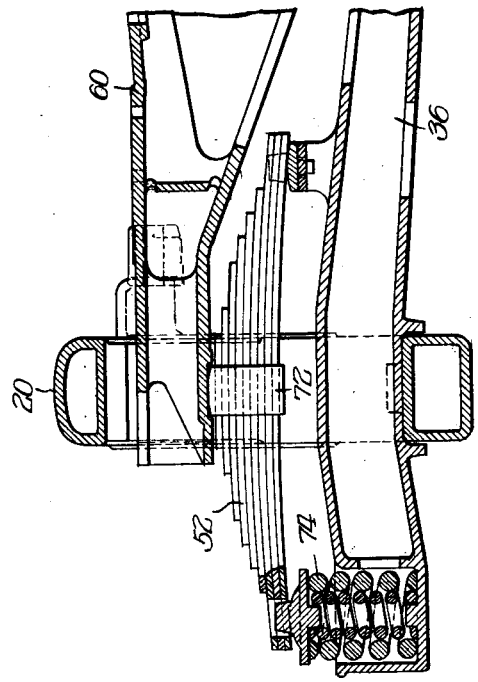
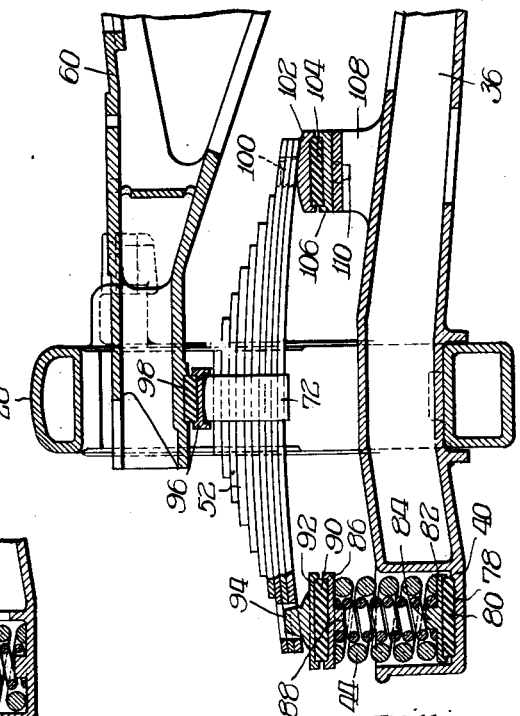
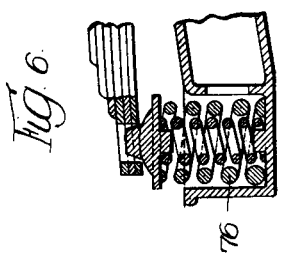
Inventor:
William C. Hedgcock,

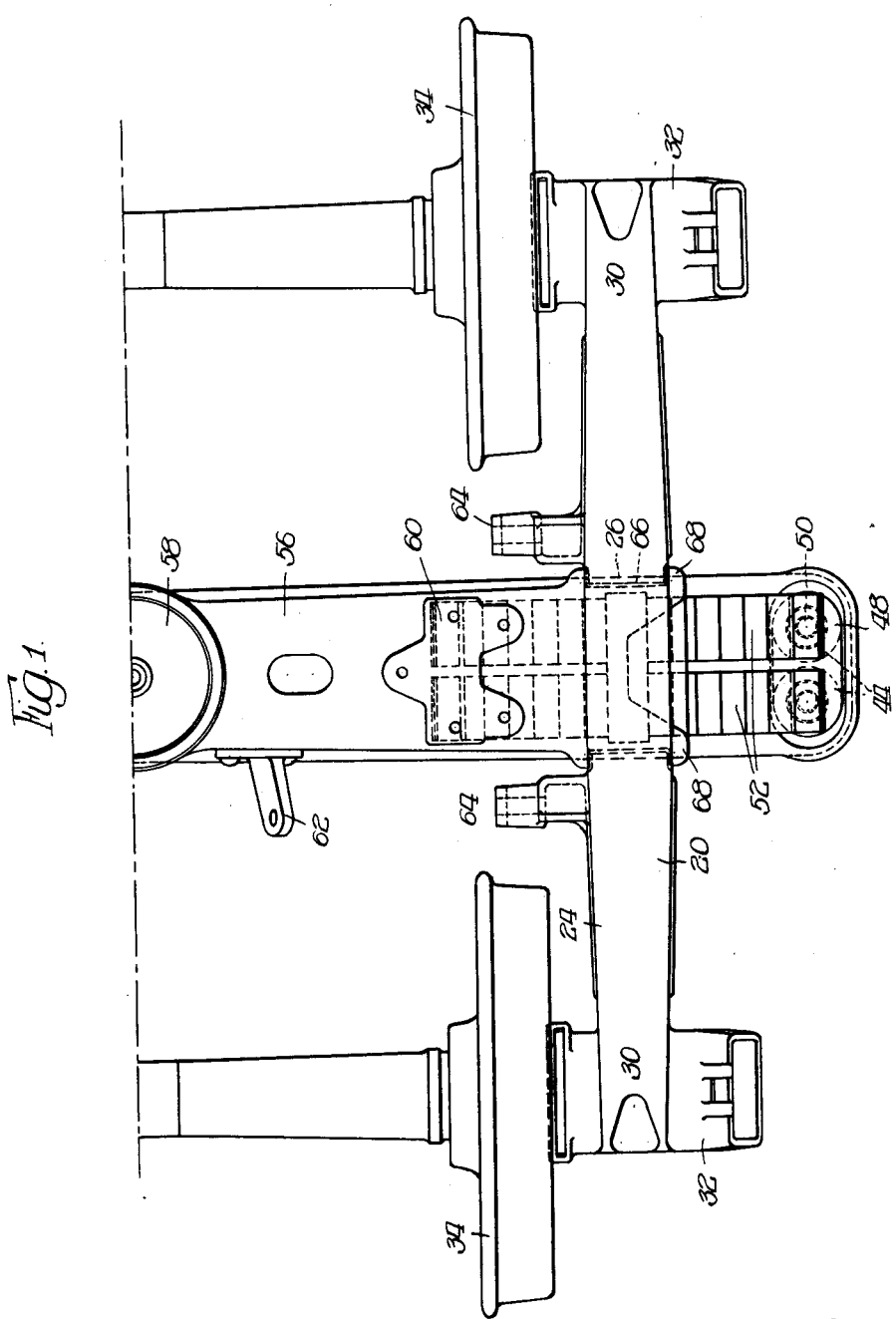

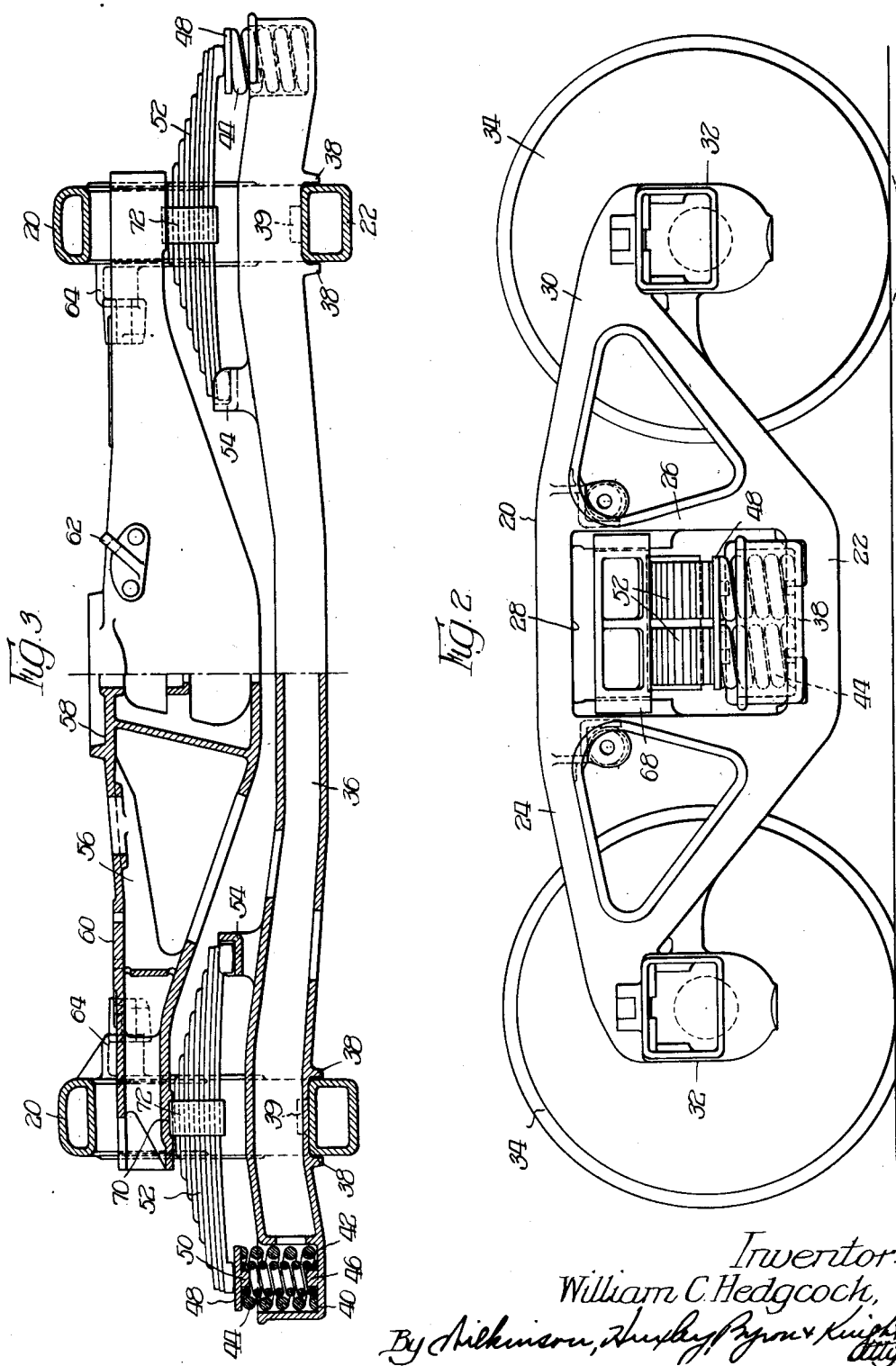

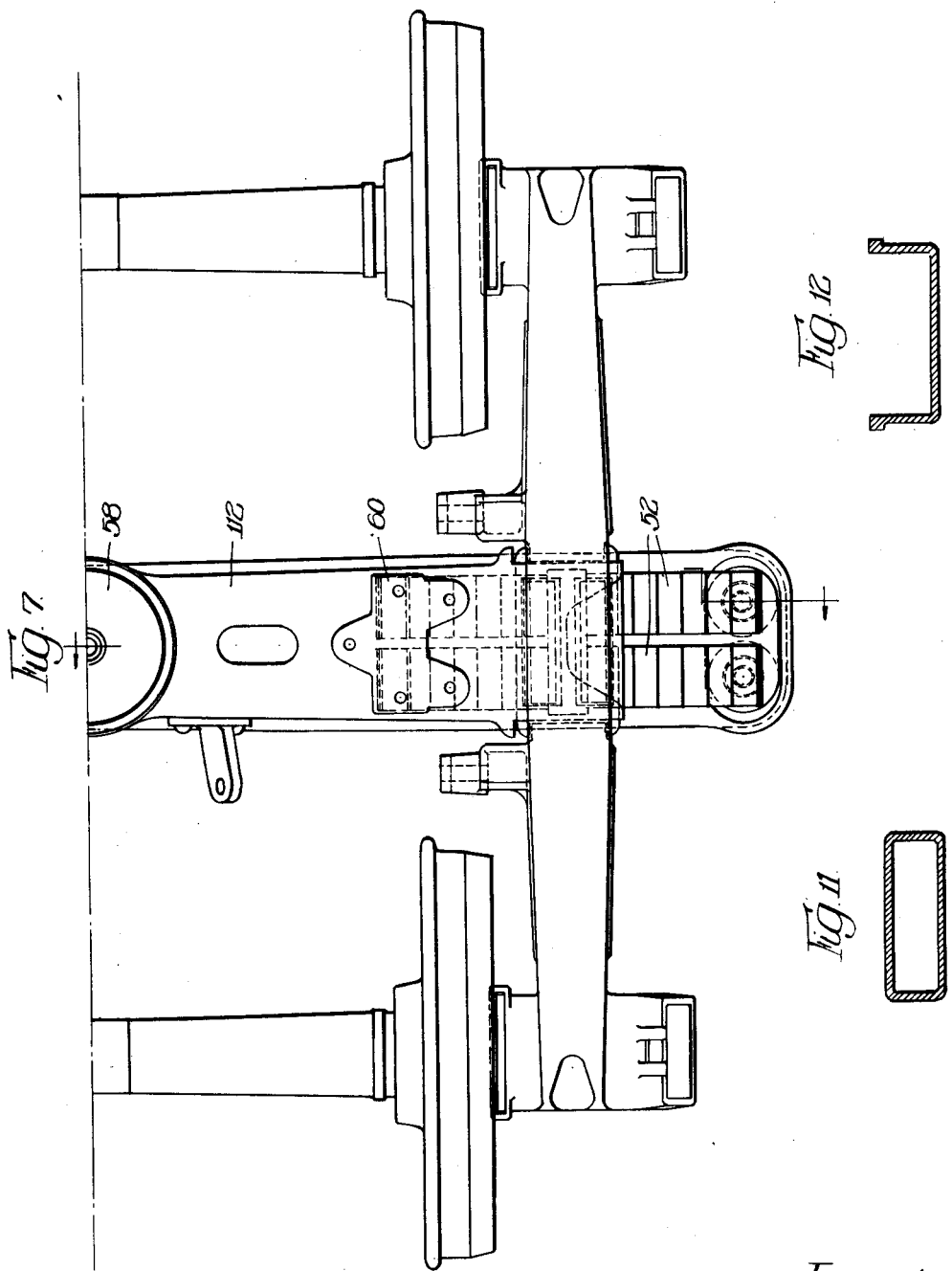

June 27, 1933. W. C. HEDGCOCK 1,916,145
TRUCK
Filed Oct. 2, 1931 6 Sheets-Sheet 5
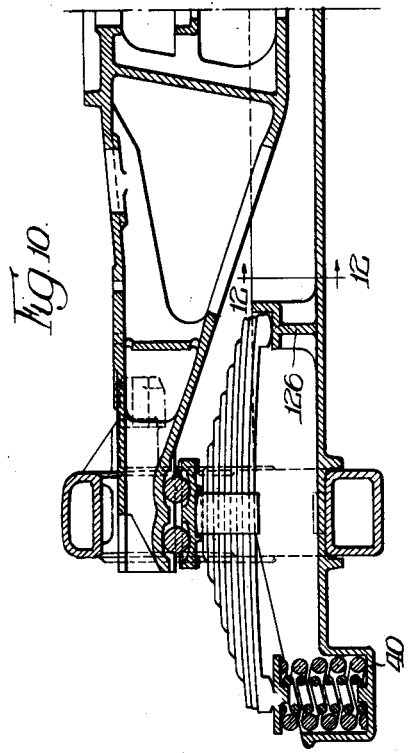
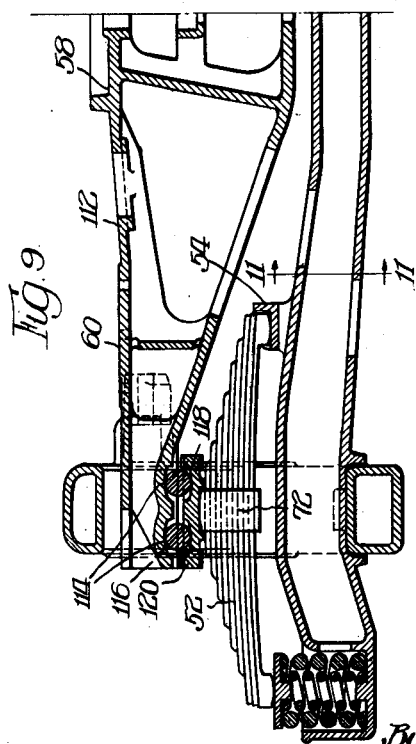
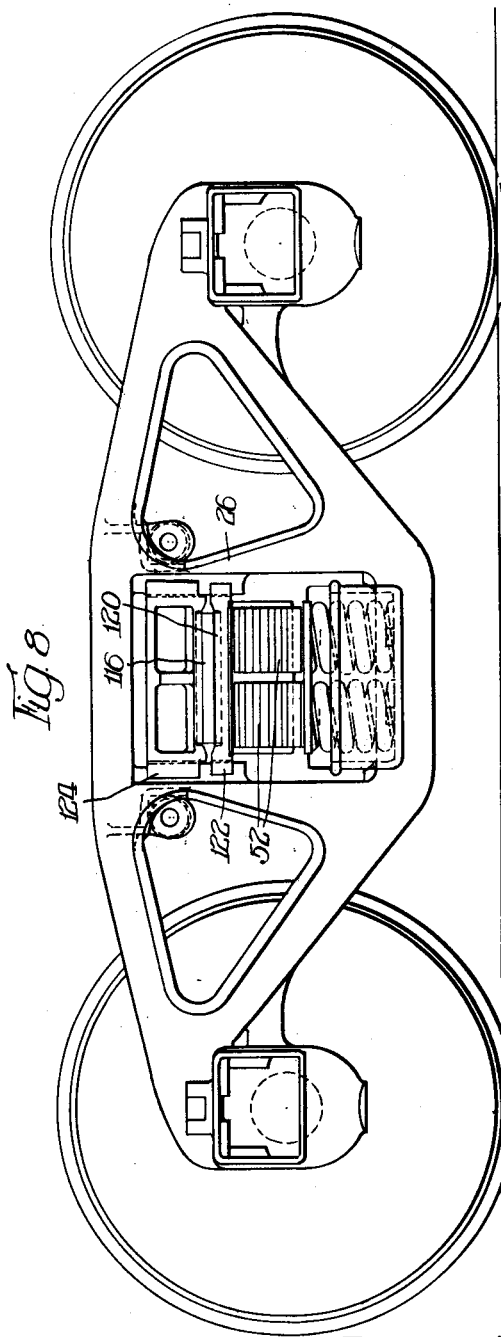
Inventor:
William C. Hedgcock,
By Dickinson, Huxley, Byron & Knight
Attys.

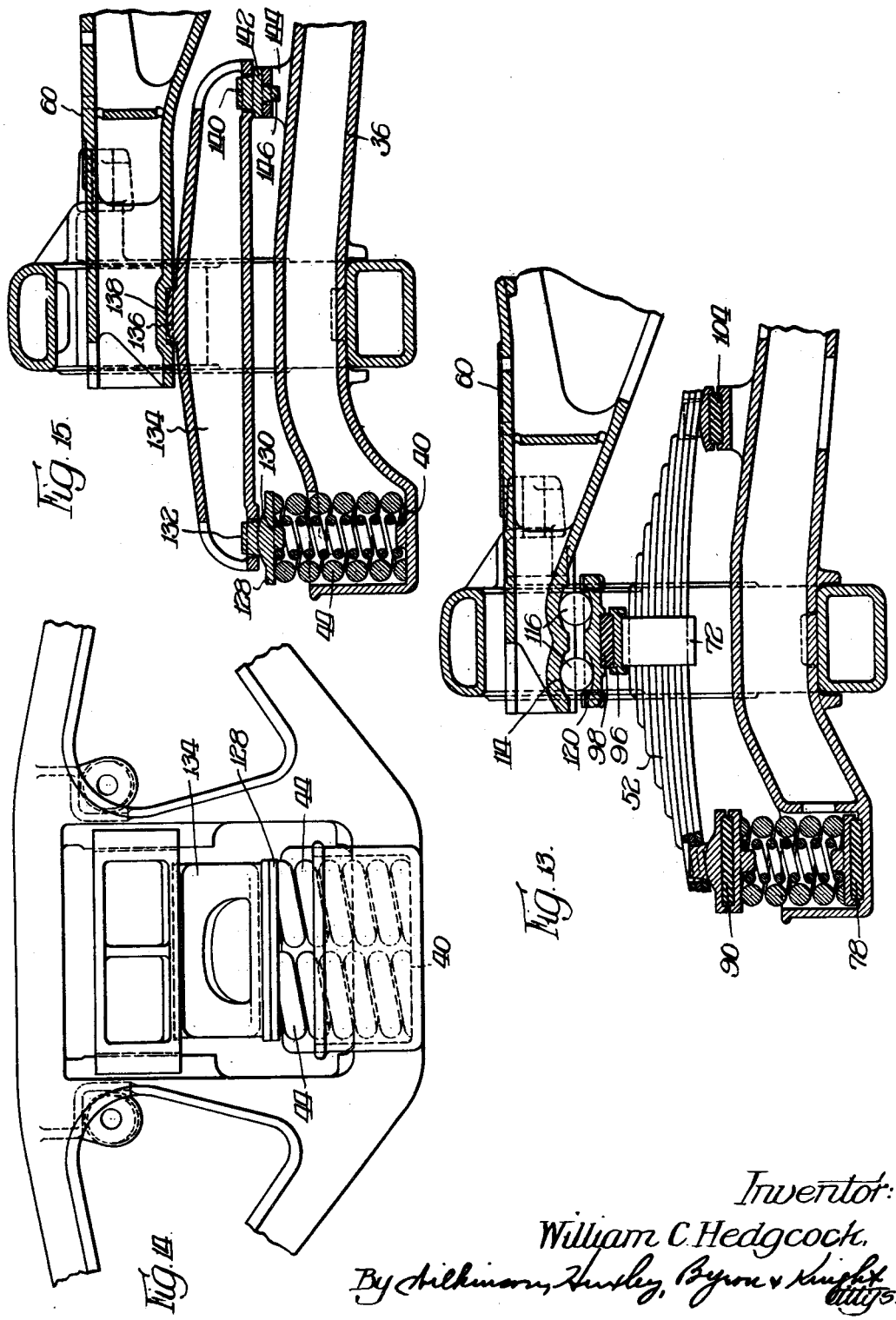

Patented June 27, 1933

1,916,145

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 2, 1931. Serial No. 566,488.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs, the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein resilient pads are provided for damping out metallic vibrations transmitted through the metallic truck parts, and also for the purpose of deadening noise.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consists of certain novel features of construction and operation, as will be more fully described and particularly pointed out in the specification, drawings and claims appended hereto.

In the drawings, which illustrate an embodiment of the device and wherein like reference character are used to designate like parts—

Figure 1 is a fragmentary top plan view of a truck construction embodying the invention;

Figure 2 is a side elevation of the truck construction shown in Figure 1;

Figure 3 is a transverse fragmentary sectional elevation, a portion thereof being taken substantially on the transverse center line of the truck construction illustrated in Figures 1 and 2;

Figures 4 and 5 are enlarged fragmentary sectional elevation showing another modified form of spring suspension;

Figure 6 is an enlarged fragmentary sectional elevation showing another modified form of spring suspension;

Figure 7 is a fragmentary top plan view of a truck construction embodying a modified form of the invention;

Figure 8 is a side elevation of the truck construction shown in Figure 7;

Figures 9 and 10 are fragmentary transverse sectional elevations of different forms of the truck construction shown in Figures 7 and 8;

Figures 11 and 12 are sectional elevations taken substantially in the planes as indicated by the lines 11—11 and 12—12 of Figures 9 and 10 respectively;

Figure 13 is an enlarged transverse sectional elevation through a modified form of truck construction similar to that shown in Figure 9;

Figure 14 is a fragmentary side elevation through still another modified form of truck construction; and Figure 15 is a transverse sectional elevation taken substantially in the transverse center line of the truck construction shown in Figure 14.

Referring first of all more particularly to the truck construction illustrated in Figures 1 to 6 inclusive, the side frame 20 is preferably of truss construction, including the tension member 22 and compression member 24 integrally connected by spaced column guides 26 forming the window 28 in said frame. The tension and compression members converge adjacent their ends as at 30 and are provided with the journal boxes 32 shown as of the standard A. R. A. construction, though they may be of any preferable construction. The journal boxes have cooperative relation with the journal ends of the wheel and axle assemblies 34 which also may be of any preferable construction.

The spaced side frames are connected and spaced by the spring plank 36 extending transversely of the truck and into and through the windows 28, the spring plank being provided with the depending flanges 38 embracing the lower arch bar of the tension member, thus holding the side frames in spaced relation laterally and against twisting laterally. The spring plank may also receive the dowel 39 provided on the lower arch bar for positioning said plank. Each end of the spring plank is provided with a spring pocket 40 having the spring seat 42 on which the coil spring assemblies 44 are carried, the spring pocket being provided with the upwardly extending positioning dowel 46. The spring cap 48 is mounted on top of the coil spring assemblies 44, positioning dowel 50 thereon cooperating with the top of said assemblies, the spring cap providing a seat for the outer end of the semi-elliptic spring assemblies 52. The opposite or inner end of the semi-elliptic springs 52 is seated on the spring seat 54 provided on the spring plank inwardly of the side frame.

The bolster 56 is provided with the usual center and side bearings 58 and 60, and brake hanger brackets 62 and 64 are provided on the bolster and side frames having cooperative relation with the usual brake rigging. The bolster is mounted with each end extending into the bolster opening or window 28, and is provided with the spaced guiding surfaces 66 and the guide lugs 68 embracing the column guides 26 for sliding cooperation therewith, whereby the bolster is maintained in lateral relation with respect to the side frame. An enlarged opening is provided in the side frame below the guiding faces of the columns for clearance for the guide lugs 68 in assembling the bolster and the side frame. The bolster is provided with the seat 70 on a lower chord thereof, said seat being disposed substantially in the plane of the side frames for cooperative relation with the spring band 72 of the spring assembly 52 whereby the bolster is supported on the spring plank partially directly by the semi-elliptic spring, and partially through the semi-elliptic spring and coil spring assemblies.

In the modification illustrated in Figure 4, the parts remain substantially the same as described above, with the exception that while a coil spring was described of constant pitch and constant section, such a spring has been replaced by the coil spring nests 74 wherein springs of variable pitch are used.

In the modification shown in Figure 6 the coil spring nests 76 are used wherein the springs are formed from a tapering bar, that is, the diameter of the sections varies. It will be understood of course that any springs of variable stiffness may be used in this or any of the other modifications shown wherein such springs, being such as illustrated in application Serial No. 552,153, filed July 21, 1931.

In the modification shown in Figure 5, cushioning means is provided between the various parts. As before, the spring plank 36 is provided with a spring pocket 40. In this modification the spring pocket is recessed as at 78 for the reception of the rubber or other resilient pad 80 disposed therein and between the spring seat member 82. The coil spring assemblies 44 are seated on the spring seat 82 positioned by means of the dowel 84, and a spring cap 86 is seated on the upper portion of the coil spring assemblies, being positioned thereon by means of the depending dowel, the spring cap 86 being recessed for the reception of the resilient or other pad 90 provided between the spring cap and the spring seat member 92, said spring seat member 92 being provided with the upwardly extending positioning dowel 94 received in a suitable aperture provided in the outer end of the leaf spring assemblies 52. The spring band 72 is seated in the member 96 which is recessed for the reception of the resilient or other pad 98 provided between the member 96 and a suitable recess formed in the outer end of the bolster 60. The inner end of the leaf spring assembly is apertured for the reception of the positioning dowel provided on the seat member 102, said seat member being downwardly recessed for the reception of the resilient pad 104 provided between said member and the complementary member 106 seated on the pedestal 108 provided on the spring plank 36, the member 106 being provided with the positioning dowel 110 received in a suitable aperture formed in the pedestal 108.

In the constructions shown in Figures 7 to 13 inclusive, the lateral motion bolster 112 is provided, said bolster being provided with the center bearing 58 and the side bearings 60 and extending into the bolster opening. The bolster in this case, instead of seating directly on the spring bands 72 of the leaf spring assemblies 52 is provided with lateral motion roller tracks 114 for receiving the lateral motion rollers 116 seated on suitable tracks 118 provided in the roller seat member 120, said member being seated on the spring band 72. The roller seat member 120 is guided between the column guides 26 and is provided with the spaced lugs 122 embracing said columns for preventing displacement of said member. The bolster is provided with the lugs 124 which permit a suitable lateral motion of the bolster. The bolster is thereby permitted a certain amount of lateral motion to reduce lateral shocks which might be transmitted between the side frame and the bolster, the extent of the lateral motion being limited by means of the stops or lugs 124.

With the type of trucks described herein the spring plank is a load carrying member in the nature of a beam supported at two spaced points and loaded at four spaced points. This necessitates the spring plank being made strong enough to resist the bending action resulting from such a method of loading, and for this purpose the spring plank may be made of any suitable section, such as the box section shown in Figure 11, or may be made of some other section such as the channel section shown in Figure 12. In the case where a box section is provided, the spring seat 54 or pedestal 108 is provided on the upper chord, and the spring plank is depressed for proper clearances between the bolster and to obtain the proper depth for the springs.

In the constructions shown in Figures 10 and 12, the pedestal 126 of the inner end of the leaf spring is provided on the lower chord or web of the U-shaped spring plank. The outer end of the spring plank is provided with the spring pocket 40 of suitable depth.

In the construction shown in Figure 13, rubber pads 78, 90 and 104 are provided in a manner already described with respect to Figure 5. The spring band is seated in the member 96, said member being recessed for receiving the resilient pad 98, said pad being received in a suitable recess provided in the roller cap 120. It will of course be understood that in this and other modifications the resilient pads may be provided between the lower arch bar and the spring plank.

In the modification illustrated in Figures 14 and 15, the spring plank 36 is provided with a coil spring pocket 40 for the reception of the coil spring assemblies 44, the spring cap 128, similar to the spring caps illustrated in Figures 4 and 6, being provided positioned on the upper ends of the coil springs by means of the depending dowel 130. The cap is provided with the upstanding dowel 132 which in this modification is received in a suitable aperture provided in the substantially rigid equalizer or load distributing member 134. The equalizer member is provided with the arcuate fulcrum portion 136 received in a suitable seat 138 provided on the bolster 60. The inner end of the equalizer member is apertured and receives the upstanding dowel 140 of the seat member 142 positioned on the pedestal 144 by means of the depending dowel 146.

In operation of the above identified structures, the coil springs and leaf springs, where such are used, are in series. Each can work independently of the other, and the coil springs are free to respond quickly to sudden shocks, the leaf springs conforming to slower impulses. However, each reacts against the other and effectively serves to ripple out or break up synchronous vibration. This is particularly effective where the two types of springs have different vibration periods. During the action of either spring the leaf spring also acts as an equalizer to compensate for differences in level between its non-resilient end connection and its resilient end connection. The leaf springs do a certain amount of work absorption which also tends to defeat synchronous vibration, and yet does not impair the sensitiveness of the coil springs.

As will be seen, the advantage of the easy riding passenger truck spring suspension is obtained, yet with an economy of spring material since the coil springs carry only half the load and therefore less coil spring material is required. Also, by combined motion of the coil and leaf springs, sufficient travel is obtained for soft motion, and thus semi-elliptic leaf springs are used rather than full-elliptic, which thus requires less leaf spring material.

The advantages of this system are obtained by the novel arrangement of springs, bolster, side frame, spring plank, and associated parts, thereby a minimum amount of spring weight and structural parts and weights are required to properly distribute and transmit the loads. This is largely accomplished with the four point support on the spring plank, having spaced non-resilient connections and spaced resilient connections (through the coil springs) to the leaf springs, operating as a connection for the spring suspension system, and distributing the loads from the spring system to the side frames. A spring plank is a part usually required with existing car trucks, and by improving it with novel features and using it in connection with other novel features, the addition of other heavy structural members is avoided, and the advantages of an easy riding spring suspension is obtained.

Provision is made for adjusting the height of the bolster above the rail to compensate for wheel wear and other causes which might result in undesired variations in car coupler heights above the rail. This provision for adjustment is made in the connection between the spring plank and the side frame. When height adjustment is desired, the spring plank is raised above its seat on the lower arch bar and a shim of the desired thickness is inserted between the spring plank and said lower arch bar. The depending flanges 38 are therefore made of sufficient downward projection so that they may still engage the sides of the lower arch bar when a shim is in place between the two members.

While the drawings referred to herein show the center of the semi-elliptic leaf spring located at the center line of the side frame with the supports for the leaf spring spaced equi-distant each side of the side frame transversely of the truck, it should be understood the leaf spring is not necessarily to be located symmetrical with the center line of the side frame but that the leaf springs may be placed closer together transversely of the truck or farther apart.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is—

1. In a car truck, the combination of a side frame including tension and compression members and integral connecting column guides forming a window, a spring plank, a bolster extending into said window, a leaf spring supporting said bolster at a point and supported on said spring plank at a plurality of points, one of said points of support of said leaf spring being through a resilient member.

2. In a car truck, the combination of a spring plank, semi-elliptic springs mounted on the ends of said spring plank and each supported at spaced points, and a spring interposed between said springs and one of said spaced points and a bolster supported by said springs.

3. In a car truck, the combination of a detachable spring plank, spaced semi-elliptic springs each supported thereon at spaced points, and a spring interposed between said springs and one of said spaced points and a bolster engaging each of said first named springs at a single point.

4. In a car truck, the combination of spaced side frames and a spring plank connecting the same, semi-elliptic springs mounted on the ends of said spring plank and each supported at spaced points, and a spring interposed between said springs and one of said spaced points and a bolster supported by said springs.

5. In a car truck, the combination of spaced side frames and a spring plank connecting the same, spaced semi-elliptic springs each supported thereon at spaced points, and a spring interposed between said springs and one of said spaced points and a bolster engaging each of said first named springs at a single point.

6. In a car truck, the combination of a side frame, a detachable spring plank, a coil spring carried by said spring plank, a semi-elliptic leaf spring supported at one end by said coil spring and at the other end directly by said spring plank, and a bolster supported by said springs.

7. In a car truck, the combination of a side frame, a spring plank, a semi-elliptic leaf spring supported thereon at spaced points, one of said points of support including a coil spring, and a bolster supported by said springs.

8. In a car truck, the combination of spaced side frames and a spring plank supported thereby, coil springs engaging said spring plank, semi-elliptic leaf springs engaging said spring plank and partially supported by said coil springs, and a bolster supported by said springs.

9. In a car truck, the combination of spaced side frames and a removable spring plank supported thereby, spaced coil springs supported by said spring plank, spaced semi-elliptic leaf springs supported partly by said coil springs and partly directly by said spring plank, and a bolster supported by said springs.

10. In a car truck, the combination of a side frame and a transverse member, a semi-elliptic leaf spring supported on said spring plank at spaced points, one of said points of support including a coil spring, and a bolster engaging said leaf spring.

11. In a car truck, the combination of a side frame and a transverse member, a semi-elliptic leaf spring supported on said spring plank at spaced points, one of said points of support including a coil spring, lateral motion means carried by said leaf spring, and a bolster supported on said lateral motion means.

12. In a car truck, the combination of a spring plank, a semi-elliptic spring supported thereon at spaced points, one of said spaced points being resilient, lateral motion roller means supported by said semi-elliptic spring, and a bolster carried on said lateral motion roller means.

13. In a spring plank for car trucks, the combination of spaced pockets for coil springs, spaced seats for leaf springs, and spaced lugs disposed adjacent each end of said plank for connecting said plank to truck frames.

14. In a car truck, the combination of spaced side frames including tension and compression members and integral connecting column guides each forming a window, a spring plank connecting said side frames, a bolster extending into said window, and a resilient load distributing member supporting said bolster at a plurality of points on said spring plank adjacent said side frames, one of said points of support being resilient.

15. In a car truck, the combination of spaced side frames including tension and compression members and integral connecting column guides each forming a window, a spring plank connecting said side frames, a bolster extending into said window, and a resilient equalizer member supporting said bolster at a plurality of points adjacent said side frames, said points being on said spring plank inwardly and outwardly of said side frames, one of said points of support being resilient.

16. In a car truck, the combination of spaced side frames including tension and compression members and integral connecting column guides each forming a window, a spring plank connecting said side frames, a bolster extending into said window, and a semi-elliptic spring supporting said bolster adjacent each end thereof, said semi-elliptic spring being supported on said spring plank inwardly and outwardly of said side frames, one of said points of support being resilient.

17. In a car truck, the combination of spaced side frames including tension and compression members and integral connecting column guides each forming a window, a spring plank connecting said side frames, a bolster extending into said window, and a semi-elliptic spring supporting said bolster on said spring plank adjacent each end of said spring, one of the points of support being resilient.

18. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between one end of said semi-elliptic spring and said spring plank.

19. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between the outer end of said semi-elliptic spring and said spring plank.

20. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between one end of said semi-elliptic spring and said spring plank, said coil spring being of variable pitch.

21. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between one end of said semi-elliptic spring and said spring plank, said coil spring being of variable diameter.

22. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between one end of said semi-elliptic spring and said spring plank, said coil spring being of variable stiffness.

23. In a car truck, the combination of spaced side frames including tension and compression members and integral connecting column guides each forming a window, a spring plank connecting said side frames, a bolster extending into said window, a substantially rigid load distributing member supporting said bolster at a plurality of points on said spring plank adjacent said side frames, and a coil spring interposed between one end of said load distributing member and said spring plank, the other end of said load distributing member being non-resiliently mounted on said spring plank.

24. In a car truck, the combination of a side frame and a spring plank, a semi-elliptic leaf spring supported on said spring plank at spaced points, one of said points of support including a coil spring, lateral motion means carried by said leaf spring, a bolster supported on said lateral motion means, and resilient pads disposed between said springs.

25. In a car truck, the combination of a side frame and a spring plank, a semi-elliptic leaf spring supported on said spring plank at spaced points, one of said points of support including a coil spring, lateral motion means carried by said leaf spring, a bolster supported on said lateral motion means, and resilient pads disposed between said springs and between said springs and the associated truck parts.

26. In a car truck, the combination of a side frame and a spring plank, a semi-elliptic leaf spring supported on said spring plank at spaced points, one of said points of support including a coil spring, lateral motion means carried by said leaf spring, a bolster supported on said lateral motion means, and resilient pads disposed between one of said springs and the associated truck parts.

27. In a car truck, the combination of side frames, a member connecting said side frames, a load carrying member and a movable member disposed between said load carrying member and first named member and supported on said first named member at a plurality of points and above the same, and resilient means interposed between one of said points and said movable member.

28. In a car truck, the combination of side frames, a member connecting said side frames, a load carrying member and a resilient movable member disposed between said load carrying member and first named member and supported on said first named member at a plurality of points and above the same, and resilient means interposed between one of said points and said movable member.

29. In a car truck, the combination of side frames, a member connecting said side frames, a load carrying member and a movable member disposed between said load carrying member and first named member and supported on said first named member at a plurality of points and above the same, and resilient means interposed between one of said points and said movable member, said movable member supporting said load carrying member at a single point.

30. In a car truck, the combination of side frames, a member connecting said side frames, a load carrying member and a movable member disposed between said load carrying member and first named member and supported on said first named member at a plurality of points and above the same, and resilient means interposed between one of said points and said movable member, said movable member supporting said load carrying member at a single point disposed between said plurality of points.

31. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame and the other of said points being outwardly of said side frame.

32. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame.

33. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being outwardly of said side frame.

34. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame and the other of said points being outwardly of said side frame, said movable member supporting said load carrying member at a single point.

35. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame, said movable member supporting said load carrying member at a single point.

36. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being outwardly of said side frame, said movable member supporting said load carrying member at a single point.

37. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame and the other of said points being outwardly of said side frame, said movable member supporting said load carrying member at a single point disposed between said plurality of points.

38. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame, said movable member supporting said load carrying member at a single point disposed between said plurality of points.

39. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being outwardly of said side frame, said movable member supporting said load carrying member at a single point disposed between said plurality of points.

40. In a car truck, the combination of side frames, a member connecting said side frames, a load carrying member and a movable member disposed between said load carrying member and first named member and supported on said first named member at a plurality of points and above the same, and resilient means interposed between one of said points and said movable member, said movable member supporting said load carrying member at a single point substantially in the plane of said side frame.

41. In a car truck, the combination of side frames, a member connecting said side frames, a load carrying member and movable member disposed between said load carrying member and first named member and supported on said first named member at a plurality of points and above the same, and resilient means interposed between one of said points and said movable member, said movable member supporting said load carrying member at a single point disposed between said plurality of points and substantially in the plane of said side frame.

42. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame and the other of said points being outwardly of said side frame, said movable member supporting said load carrying member at a single point substantially in the plane of said side frame.

43. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame, said movable member supporting said load carrying member at a single point substantially in the plane of said side frame.

44. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being outwardly of said side frame, said movable member supporting said load carrying member at a single point substantially in the plane of said side frame.

45. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame and the other of said points being outwardly of said side frame, said movable member supporting said load carrying member at a single point disposed between said plurality of points substantially in the plane of said side frame.

46. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being inwardly of said side frame, said movable member supporting said load carrying member at a single point disposed between said plurality of points substantially in the plane of said side frame.

47. In a car truck, the combination of side frames, a member connecting said side frames, a load carrying member and a movable member disposed between said load carrying member and first named member and supported on said first named member at a plurality of points and above the same, and resilient means interposed between one of said points and said movable member, one of said points being outwardly of said side frame, said movable member supporting said load carrying member at a single point disposed between said plurality of points substantially in the plane of said side frame.

48. In a car truck, the combination of side frames, a member connecting said side frames, a load carrying member and a movable member disposed between said load carrying member and first named member and supported on said first named member at a plurality of points and above the same, and resilient means interposed between one of said points and said movable member, said resilient means including a coil spring.

49. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said resilient means including a coil spring and the other of said points being non-resilient.

50. In a car truck, the combination of side frames, a member connecting said side frames, a load carrying member and a movable member disposed between said load carrying member and first named member and supported on said first named member at a plurality of points and above the same, and resilient means interposed between one of said points and said movable member, said resilient means including a coil spring and the other of said points being resilient.

51. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said resilient means including a coil spring, said movable member supporting said load carrying member at a single point.

52. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said resilient means including a coil spring, said movable member supporting said load carrying member at a single point disposed between said plurality of points.

53. A spring plank for car trucks, including a substantially box-shaped body portion, said portion having a spring pocket adjacent an end thereof for the reception of a coil spring, a leaf spring seat disposed above said body portion adjacent said pocket, and means on the bottom chord of said body portion between said pocket and seat for positioning said plank.

54. A spring plank for car trucks, including a substantially U-shaped body portion, said portion having a spring pocket adjacent an end thereof for the reception of a coil spring, a leaf spring seat disposed within said body portion adjacent said pocket, and means on the bottom chord of said body portion between said pocket and seat for positioning said plank.

55. A spring plank for car trucks, including a substantially U-shaped body portion, said portion having a spring pocket adjacent an end thereof for the reception of a coil spring, a leaf spring seat disposed within said body portion adjacent said pocket, and means for positioning said plank.

56. A spring plank for car trucks, including a substantially box-shaped body portion, said portion having a spring pocket for the reception of a coil spring, a leaf spring seat disposed above said body portion adjacent said pocket, and means on the bottom chord of said body portion between said pocket and seat for positioning said plank.

57. A spring plank for car trucks, including a substantially box-shaped body portion, said portion including tension and compression members, said portion having a spring pocket adjacent an end thereof and below said compression member for the reception of a coil spring, a leaf spring seat disposed above said body portion adjacent said pocket, and means for positioning said plank.

58. A spring plank for car trucks, including a substantially U-shaped body portion, said portion having a spring pocket within said body portion, a seat adjacent said pocket, and means on the bottom chord of said body portion between said pocket and seat for positioning said plank.

59. A spring plank for car trucks, including a body portion, said portion having a spring pocket within said body portion, a seat adjacent said pocket, and means between said pocket and seat for positioning said plank.

60. In a truck, the combination of a side frame, a member supported on said side frame, a load carrying member, and a movable member disposed between said load carrying member and first named member and supported on said first named member at a plurality of points and above the same, and resilient means interposed between one of said points and said movable member and disposed in a pocket provided in said first named member, said load carrying member being mounted on lateral motion means carried by said movable member.

61. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said load carrying member being mounted on lateral motion means carried by said movable member.

62. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, another of said points being non-resilient, said load carrying member being mounted on lateral motion means carried by said movable member.

63. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said movable member being resilient, said load carrying member being mounted on lateral motion means disposed substantially above said movable member.

64. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said load carrying member being mounted on lateral motion means resiliently disposed substantially above said movable member.

65. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said load carrying member being mounted on lateral motion means resiliently disposed substantially above said movable member.

66. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, another of said points being non-resilient, said load carrying member being mounted on lateral motion means resiliently carried by said movable member.

67. In a truck, the combination of a side frame, a member supported on said side frame, a load carrying member, and a movable member disposed between said load carrying member and first named member and supported on said first named member at a plurality of points and above the same, and resilient means interposed between one of said points and said movable member, said movable member being resilient, said load carrying member being mounted on lateral motion means resiliently disposed substantially above said movable member.

68. In a car truck, the combination of side frames, a member connecting said side frames, a load carrying member and a movable member disposed between said load carrying member and first named member and supported on said first named member at a plurality of points and above the same, and resilient means interposed between one of said points and said movable member.

69. A spring plank for car trucks, including a substantially box shaped body portion, said portion including tension and compression members, said portion having a spring pocket adjacent an end thereof and below said compression member for the reception of a coil spring, a leaf spring seat disposed above the compression member adjacent said pocket, and means for positioning said plank.

Signed at Chicago, Illinois, this 22nd day of September, 1931.

WILLIAM C. HEDGCOCK.